No. 834,165. PATENTED OCT. 23, 1906.
A. RASPILLAIRE.
GLASS DRAWING AND SHAPING MACHINE.
APPLICATION FILED SEPT. 26, 1905.
3 SHEETS—SHEET 3.
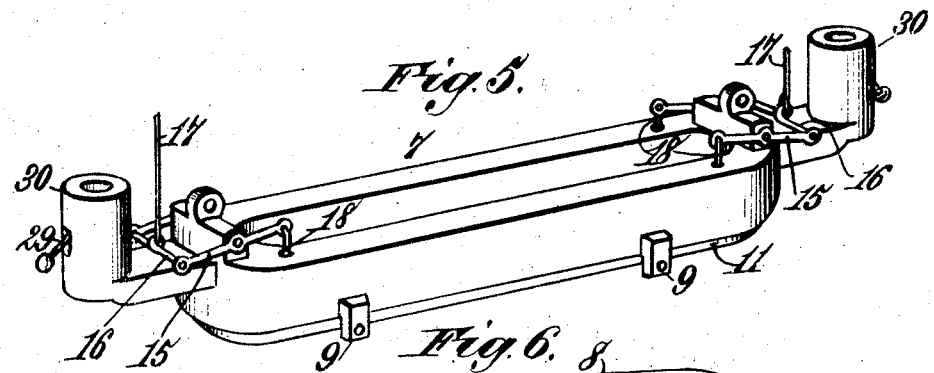
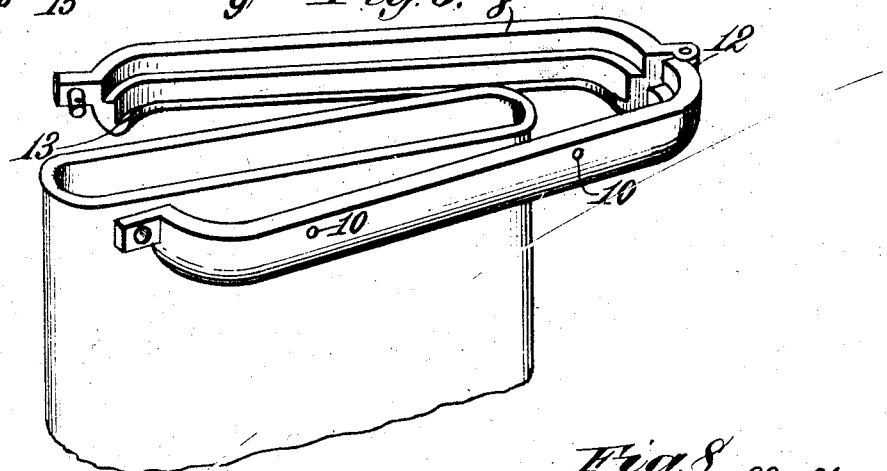
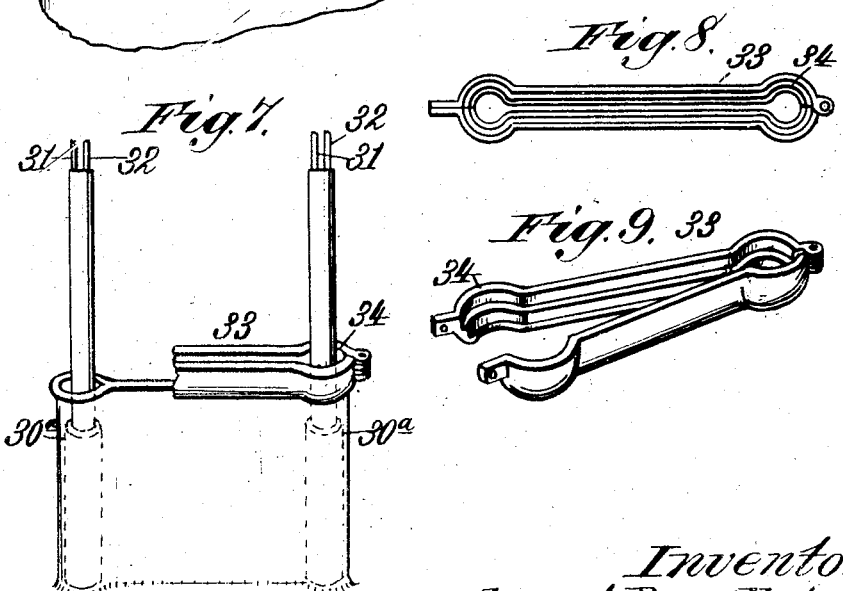
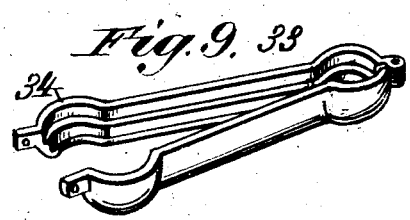
Witnesses.
Inventor
August Raspillaire.
By James L. Norris
Atty.

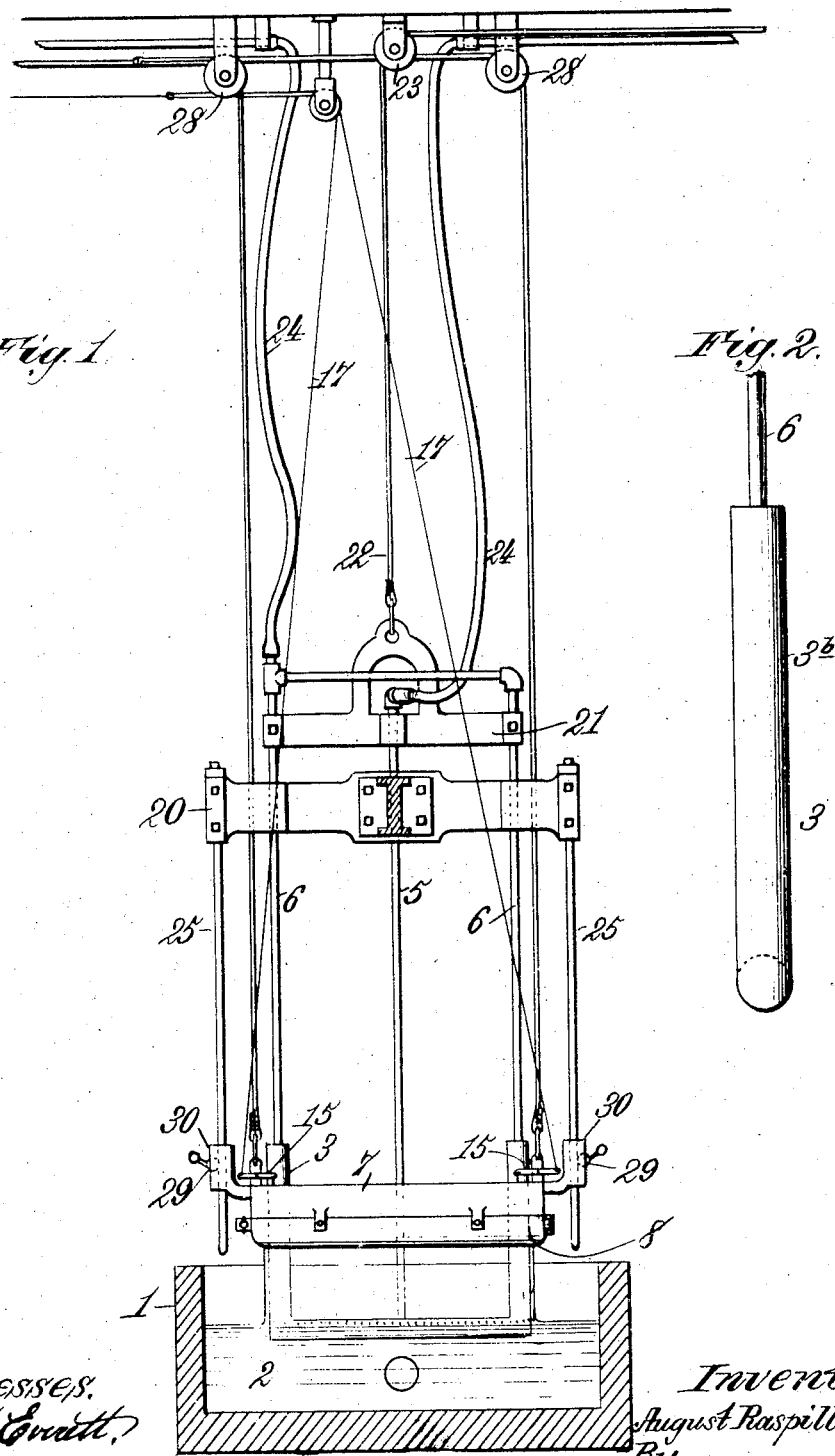

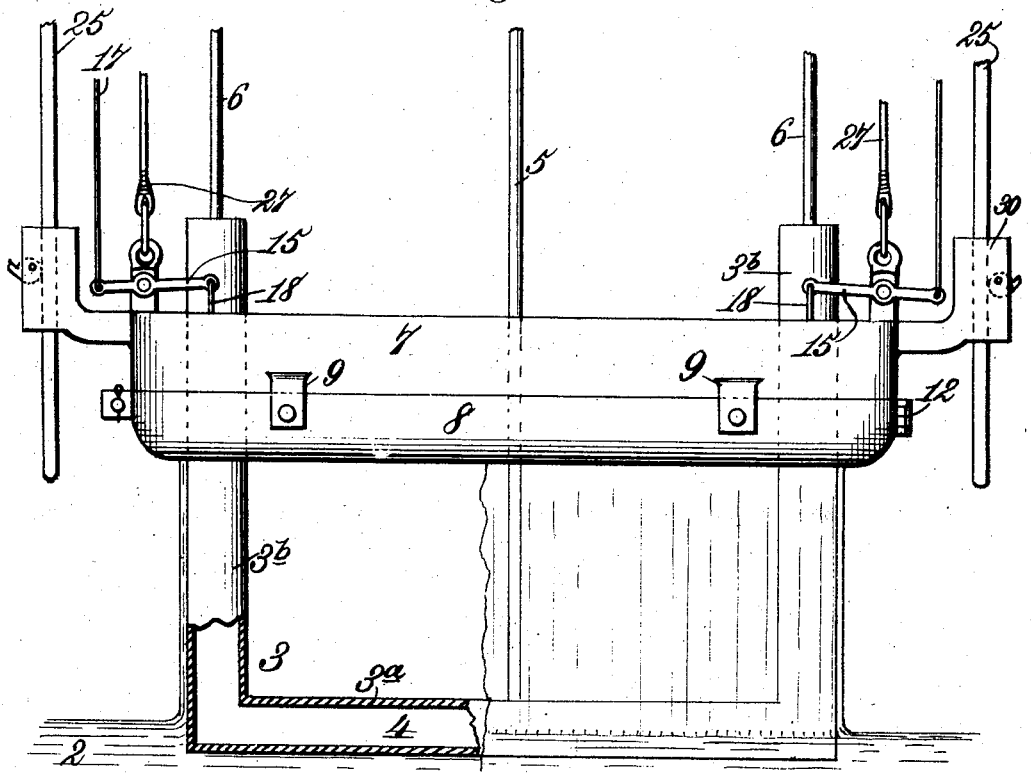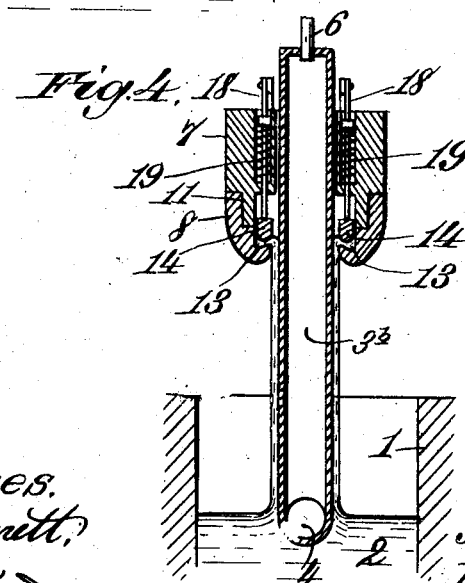

UNITED STATES PATENT OFFICE.

AUGUST RASPILLAIRE, OF MORGANTOWN, WEST VIRGINIA, ASSIGNOR OF ONE-THIRD TO JOSEPH L. KEENER AND ONE-THIRD TO JAMES P. WARRICK, OF MORGANTOWN, WEST VIRGINIA.

GLASS DRAWING AND SHAPING MACHINE.

No. 834,165.    Specification of Letters Patent.    Patented Oct. 23, 1906.

Application filed September 26, 1905. Serial No. 280,197.

*To all whom it may concern:*

Be it known that I, AUGUST RASPILLAIRE, a citizen of the United States, residing at Morgantown, in the county of Monongalia and State of West Virginia, have invented new and useful Improvements in Glass Drawing and Shaping Machines, of which the following is a specification.

My invention relates to a machine for simultaneously drawing glass from a molten mass of glass and imparting desired shape to the "draw."

The invention has for its object to provide a machine including as elements thereof a "former," which determines and imposes upon the draw the desired shape and a means coöperating therewith to draw the glass about or over said former.

The invention has also for its object to improve the glass-drawing element of the mechanism.

To the ends stated the invention consists in the mechanism hereinafter described, and illustrated in the accompanying drawings.

That which is regarded as new will be set forth in the clauses of claim appended to the description.

In the said drawings, Figure 1 is a front elevation partly in section; Fig. 2, an end elevation of the former; Fig. 3, a front elevation showing the apparatus in practical coöperative relation to a bath of molten glass. Fig. 4 is a cross-sectional elevation. Fig. 5 is a perspective view of the bait-body. Fig. 6 is a similar view of the bait and the leading end of the draw of glass, showing said bait open to permit detachment of the glass therefrom. Fig. 7 is an elevation of a modified form of former and bait. Fig. 8 is a top plan view of the apparatus shown in Fig. 7. Fig. 9 is a perspective view of the bait shown in Fig. 7.

The molten glass to be drawn may be contained within any suitable receptacle 1, which may be the forehearth of a glass-melting tank of any ordinary kind, from which in any known way the glass may pass into the receptacle in the form of a molten mass 2.

My improved machine comprises a former 3, which, as shown, is of skeleton type, consisting of a cross-arm 3ª and vertical legs 3ᵇ. The function of the cross-arm, as will hereinafter more fully appear, is to separate the glass as it leaves the molten mass into two walls or sheets, as illustrated in Fig. 4, and, together with the vertical legs, impart the desired cross-sectional shape and dimensions to the draw.

The former may be of any suitable configuration to impart to the draw a tubular formation of any desired shape. That illustrated in the drawings is one the use of which will result in an oblong tubular draw, such as illustrated in Fig. 6. The former may be of other configuration—for instance, to draw a cylinder or hexagonal or octagonal tube. Preferably, and as shown, the former is of skeleton form; but I do not limit the invention in its broader aspect to such character of former, though such is preferred as being more economical of manufacture and having greater facility of manipulation. The former is provided with means for circulation of a cooling fluid, such as air or water therethrough, for the purpose of keeping it cool to avoid possibility of the hot glass adhering thereto, and also for the purpose of chilling the walls of the glass interiorly as they leave the molten mass, imparting a partial set thereto.

As shown in Figs. 3 and 4, in the actual practice of drawing glass with an apparatus constructed according to my invention the former will be brought to the molten mass of glass until the cross-arm 3ª at the lower end thereof is partially submerged in the mass. I do not restrict the apparatus to this item of use, but claim it for all practical manners of use to which it is capable. When the glass is drawn from the molten mass about and against the active shaping-surfaces of the former, sufficient set is imparted to the separated walls of glass to maintain said walls in flat-sheet form by the time the glass, as it is withdrawn, passes beyond the cross-arm 3ª by reason of the cooling influence of the former and the cooling effect of the external atmosphere. It is because of this sufficient setting of the walls of glass at this time that a solid rather than a skeleton former is not essential, and aside from the advantages attending a skeleton former, as hereinbefore set forth, there is manifestly a minimum of friction as compared with what would exist if the walls of glass were drawn against the sides of a solid former. It is proper here to remark that the circulation of cooling fluid through the former enables thicker walls of glass to be drawn than would otherwise be possible, and the thickness of the walls is determined mainly by the degree of chill of the former and the rate at which the glass is drawn from the molten mass.

In the illustrated example of my invention the water-circulation is secured by providing a closed conduit 4 through the former with an induct-pipe 5, leading into the cross-arm $3^a$, and educt-pipes 6, leading from the ends of the vertical legs.

Combined with the former is the drawing implement by which the glass is drawn over or about said former. This drawing implement is shown in separated detail in Figs. 5 and 6 of the drawings and consists of a body 7 and a bait 8, detachably connected thereto. The drawing implement surrounds and is of cross-sectional dimensions and configuration corresponding to the effective like dimensions and configuration of the former and has an operatively close fit to the former, whereby the glass in being drawn will contact with the active shaping-surfaces of the former to determine the cross-sectional size and shape of the draw. The detachable connection of the body 7 and bait 8 is, in the illustrated example, by way of perforated ears 9 on the body, through which pins are adapted to be entered and engage in recesses 10 in the bait. It is obvious that other means of connection may be employed. As shown, the body is rabbeted about its lower edge, as shown at 11, and the bait is fitted into the rabbet, whereby the two parts when assembled will be flush. I provide that the bait may be opened to permit easy disconnection of the draw therefrom, and to this end construct it of two parts hinged together, as at 12, one of the free ends being provided with a perforated ear adapted to receive a pin or bolt or other suitable device carried by the other for holding the parts of the bait in closed operative relation.

To insure a firm engagement of the bait with the molten glass, a groove 13 is provided therein, which groove when the two parts of the bait are closed together in operative relation constitutes a continuous channel into which when the bait is lowered into the molten mass of glass a quantity of glass flows and becomes anchored, forming a connecting-link between the bait and the molten mass of glass, enabling the bait as it is drawn away from the surface of the glass to effect a draw. To enhance the security of the engagement of the bait with the glass, means are provided to compress the lip of glass which flows into the groove of the bait and chill the same. As shown, this means consists of a pressure device 14 in the shape of a band vertically movable with relation to the groove 13. This pressure device is adapted to be forced against the lip of glass in the groove and compress the same and by contact therewith, as well as by the contact of such lip of glass with the material of the bait, the lip of glass is chilled and is not susceptible to cracking or breaking by expansion. This is because the lip of glass is completely chilled and set practically instantaneously.

The compressing device may be operated in any suitable manner, the means shown in the drawings consisting of levers 15, suitably connected at their outer ends by cross-pieces 16, to the centers of which ropes or cables 17 are connected. By drawing upon the ropes the pressure device can be lowered through the medium of links 18, pivotally connected to the levers 15 and joined to the pressure device 14 near the opposite ends thereof. Coiled springs 19 surround the several links and have bearing against the pressure device 15 and against the wall of the body of the drawing implement, tending normally to hold the pressure device retracted and to return the same to such retracted position when free to do so after the glass-lip-compressing operation has been effected. When the drawing implement has been lowered into the molten bath and a lip of glass has flowed into the groove thereof, the pressure device is forced downward against the lip of glass by pulling upon the rope, compressing the glass into the groove and chilling and setting the same, after which the ropes are released and the pressure device is retracted by means of the springs, as before described. As shown, the pressure device is intended to be manually operated; but I do not restrict my invention to such arrangement.

In the drawings I have shown suitable connections for the purpose of moving the former into intended operative relation to the molten body of glass, moving the bait into and drawing it away from the molten body of glass and withdrawing the former from within the draw, but do not restrict myself to any particular mechanism for this purpose, as various mechanical means within the skill of a mechanic may be adopted for this purpose. According to the example of such means illustrated in the drawings the induct and educt pipes 5 and 6, by which a cooling fluid is circulated through the former, are guided in a cross-head 20 and are connected at their upper ends to an arm 21, with which is connected a rope or chain 22, passing over a pulley 23, that may be manipulated to raise and lower the former. The water-circulation pipes are connected with flexible hose 24, which accommodate themselves to the movements of the former.

The body portion of the drawing implement is provided with eyearms 30, which fit about and are slidable upon and guided by posts 25, depending from the cross-head 20, and connected to said body portion of the drawing implement are ropes or chains 27, which pass over pulleys or wheels 28 and are adapted either for mechanical or manual manipulation for controlling the movement of said drawing implement.

To permit the drawing implement to be held in a stationary position as may be desired when the machine is out of operation or when it is desired not to lower the bait into the molten mass of material, eccentrics 29 are combined with the eyearms and arranged to bind upon the depending guide-posts 25 in a manner that will be obvious.

In carrying out the operation of drawing glass with the apparatus of this invention the former is lowered by the use of any suitable means, one example of which is shown in the drawings and has been described until preferably the cross-bar 3ª thereof is partly submerged in the molten glass, as shown in Figs. 3 and 4 of the drawings, and cooling fluid is caused to circulate therethrough. The former is thus in position to initiate and maintain the cross-sectional size and shape of the draw, and it remains in this position during the drawing operation. The bait is then lowered by suitable means, one example of which is shown in the drawings into the molten bath of glass which flows into the groove thereof, forming a lip or anchor which is compressed by the operation of the pressure device hereinbefore described. The bait is then moved away from the molten glass, drawing the glass in tubular sheet form over or about the former. In this operation the cross-bar of the former 3ª separates or divides the glass being drawn into walls or sheets and chills and imparts sufficient set to the glass to prevent the walls of the draw collapsing after they pass beyond said cross-bar. The chilling or setting of the glass by the cooling effect of this cross-bar is sufficient to prevent the walls collapsing. As the glass is drawn over or about the former it moves along and in contact with the vertical legs of the latter, the distance between which determines the width of the draw and, together with the cross-bar, imparts the desired cross-sectional shape thereto. The bait is drawn away from the molten glass until the desired length of draw has been attained, after which the former is withdrawn from within the draw and the draw is separated from the molten bath by means of shears or in other suitable manner. The bait may now be detached from the body portion of the drawing implement and with the draw removed and the latter annealed. From this operation it will be observed that no auxiliary means or means in addition to the former and the drawing implement are required to impart the desired cross-sectional shape to the draw, and that such shape of the draw is determined by the shape of the former, the drawing implement of course being made to conform in cross-sectional configuration and dimensions to the exterior shape and dimensions of the former.

In Figs. 7, 8, and 9 of the drawings a modified character of former and a correspondingly modified character of bait are illustrated. In these figures the former consists of two vertical legs 30ª, separated a desired distance from each other and provided with means for circulation therethrough of a cooling fluid, which may enter said legs through the pipes 31 and pass therefrom through the pipes 32. The maintaining of these vertical former-legs in a cool condition may, however, be accomplished in other manner—as, for example, by covering the same with asbestos. The bait, which coöperates with these vertical former-legs, is indicated by the reference-numeral 33 and is in the form of two parts or sections hinged together, whereby said parts may be opened out for the purpose hereinbefore explained. The two parts of this bait are shaped at their ends, as shown at 34, to constitute sleeves to fit about the vertical former-legs during the operation of raising and lowering the bait. The bait is grooved in the manner of the bait heretofore described with relation to the other figures of the drawings and for a like purpose. In the operation of drawing glass with the use of this modified form of apparatus a sheet, as distinguished from a tube, of glass is drawn, the former-legs serving to initiate and maintain a uniform width and cross-sectional shape of the draw. At a predetermined point in the height of the former-legs their diameter is diminished, as shown, to facilitate the separation of the sheet from such former-legs after the desired length of sheet has been drawn.

The operation of drawing glass with the modified form of apparatus and the subsequent step of annealing, with which, however, my invention has nothing to do, are substantially the same as those heretofore indicated with respect to the apparatus shown in the other figures of the drawings.

It will be observed from the foregoing explanation that the glass may be drawn from the molten mass in any desired shape, depending upon the shape of the former, which may be varied at will, and that the glass is so shaped solely by the former without the aid of auxiliary devices or mechanism, and that by my invention draws of various shape may be successfully effected, as contradistinguished from previous mechanical means for drawing glass, according to which, so far as I am aware, cylindrical forms only are contemplated or possible.

When it is desired to draw glass for the purpose, for instance, of window-glass—that is, in flat-sheet form—my invention, as shown in Figs. 1 to 6, is particularly valuable in that the draw is made in the form of two walls or sheets of glass without flaws and perfectly flat. The consequence of the new combination of elements is the entire elimination of the heretofore necessary process of flattening, as when glass is drawn in cylindrical form. When glass is drawn in cylindrical form, it is necessary, as is well known in the art, to crack the cylinder and then subject it to a process of flattening, which requires expensive apparatus and the constant attendance of skilled operators. According to my invention such expensive apparatus and operators are dispensed with, as glass drawn over a former of the configuration shown in the drawings results in two flat sheets of glass joined together by curved end walls, and when the draw is completed and detached from the apparatus the end walls can be readily separated from the flat-sheet walls thereof in any suitable manner, such as by cracking or by the utilization of other expedient known to the glass art.

Having thus described the invention, what I claim as new is—

1. In a machine for drawing glass, the combination of a "former" of a cross-sectional shape and proportion suitable to initiate and maintain the desired shape of the draw and a drawing implement surrounding said former.

2. In a machine for drawing glass, the combination of a water-cooled "former" of a cross-sectional shape and proportion suitable to initiate and maintain the desired shape of the draw and a drawing implement surrounding said former.

3. In a machine for drawing glass, the combination of a "former" of a cross-sectional size and proportion suitable to initiate and maintain the desired shape of the draw, means for circulating a cooling fluid through said former, a drawing implement surrounding said former, and means for operating said former and drawing implement.

4. In a machine for drawing glass, a "former" having a lower cross-bar to separate the draw into a plurality of walls or sheets, and vertical legs along which the draw is moved and which maintain the form of the draw.

5. In a machine for drawing glass, a water-cooled "former" having a lower crossbar to separate the draw into a plurality of walls or sheets, and vertical legs along which the draw is moved and which maintain the form of the draw.

6. In a machine for drawing glass, the combination of a "former" having a cross-sectional form and proportion to initially shape a draw of glass, and a drawing implement to surround the "former" and to move upward therealong and relatively thereto, said implement being provided with a groove to receive the glass when in molten condition.

7. In a machine for drawing glass, a drawing implement adapted to be dipped into a glass-bath and to draw glass therefrom, said implement provided with a groove to receive the molten glass, and means for compressing the molten glass into said groove.

8. In a machine for drawing glass, the combination with a "former," of a drawing implement surrounding the "former" and arranged to dip into a glass-bath and to draw glass therefrom around the "former," said drawing implement having a groove to receive the molten glass, and means for compressing the molten glass into said groove.

9. In a machine for drawing glass, the combination of a "former" and a drawing implement surrounding the "former" and arranged to dip into a glass-bath, and to draw glass therefrom around the "former," said drawing implement having a groove to receive the molten glass, a presser device seated in the groove and adapted to press the molten glass against the bottom of the groove, means for normally holding the presser device in retracted or inoperative position, and means for imparting a working movement to said presser device.

10. In a machine for drawing glass, the combination of a "former" and a drawing implement surrounding the "former" and arranged to dip into a glass-bath and to draw glass therefrom around the "former," said drawing implement having a groove to receive the molten glass, a presser device coöperatively arranged with relation to the groove and adapted to press the molten glass against the bottom of said groove, yieldable means for normally holding the presser device in inoperative position, and independent means for imparting a working movement to said presser device.

11. In a machine for drawing glass, a glass-drawing bait composed of two movably-connected parts which may be opened from each other to facilitate withdrawal of the glass therefrom, the axis of movement of said movably-connected parts extending depthwise of said glass-drawing bait.

12. In a glass-drawing machine, the combination with a "former," of a glass-drawing implement movable over the "former" in a vertical direction and including a bait composed of two movably-connected parts which may be opened from each other to facilitate withdrawal of the glass therefrom, the axis of movement of the movably-connected parts being vertical.

13. In a glass-drawing machine, a glass-drawing implement comprising a body part and a bait detachably connected with said body part, said bait having two movably-connected parts which may be opened from each other to facilitate withdrawal of the glass from said bait, the axis of movement of the said movably-connected parts being disposed depthwise of said implement.

14. In a glass-drawing machine, a glass-drawing implement comprising a body part and a bait detachably connected with said body part and having movably-connected sections movable about an axis extending depthwise of the said glass-drawing implement, the bait being provided with a groove to receive a lip of glass.

15. In a machine for drawing glass, a drawing implement adapted to be dipped into a glass-bath and to draw glass therefrom, said implement provided with a groove to receive the molten glass.

16. In a machine for drawing glass, a glass-drawing bait composed of two movably-connected parts which may be opened from each other to facilitate withdrawal of the glass therefrom.

17. In a glass-drawing machine, the combination with a "former," of a glass-drawing bait composed of two movable parts which may be opened from each other to facilitate withdrawal of the glass therefrom.

18. In a glass-drawing machine, a glass-drawing implement consisting of a body part and a bait composed of two movably-connected parts detachably secured to said body portion.

19. In a glass-drawing machine, a glass-drawing implement consisting of a body part and a bait composed of two movably-connected parts detachably secured to said body portion, said bait being provided with a groove to receive a lip of glass.

In testimony whereof I have hereunto set my hand in presence of two subscribing witnesses.

AUGUST RASPILLAIRE.

Witnesses:
 JAMES C. FRAZER,
 CHARLES W. HELD.